June 5, 1934.　　　　S. H. CALHOUN　　　　1,961,549
NONSKID TIRE CHAIN
Filed Sept. 19, 1933
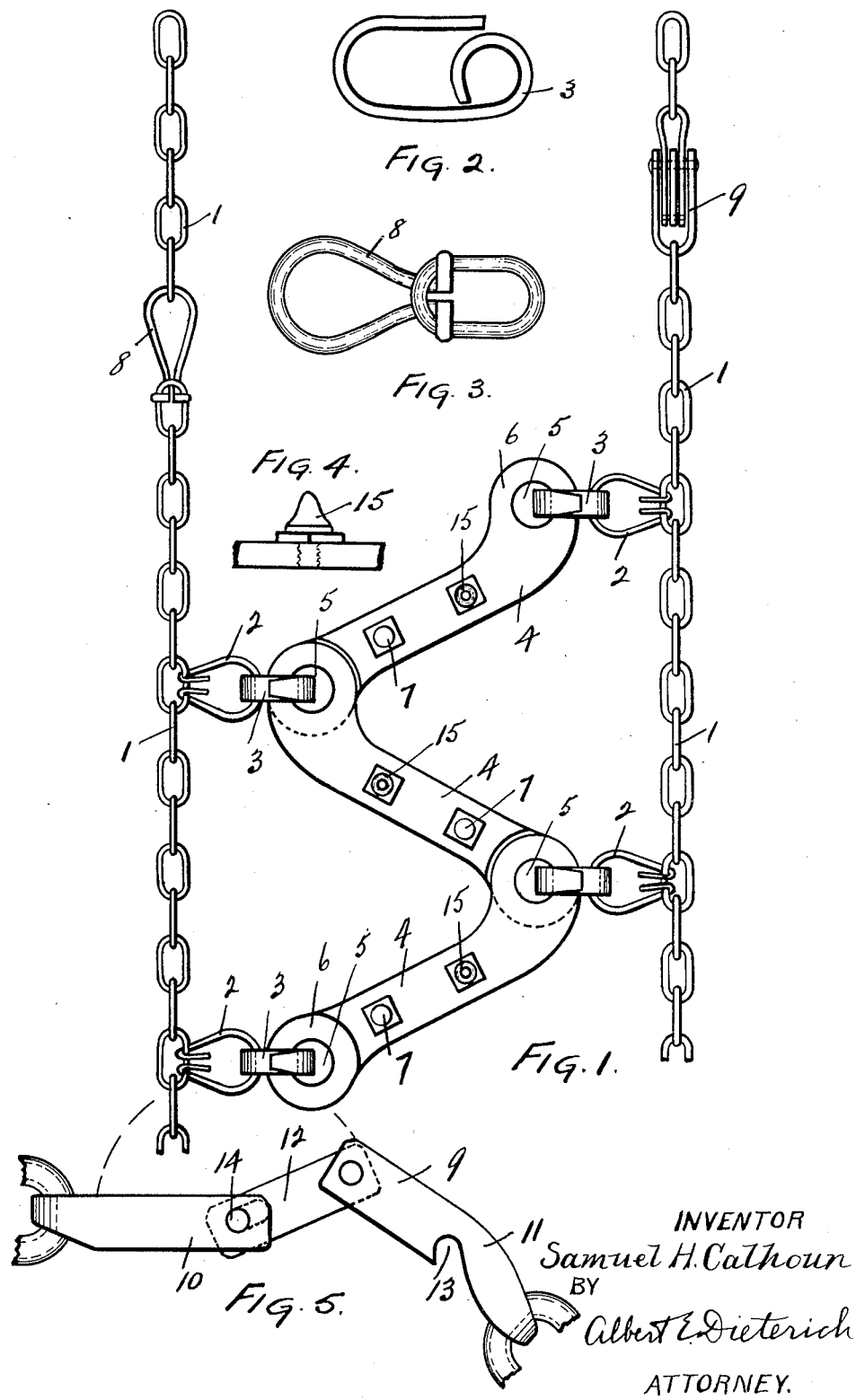
INVENTOR
Samuel H. Calhoun
BY
Albert E. Dieterich
ATTORNEY.

Patented June 5, 1934

1,961,549

UNITED STATES PATENT OFFICE 1,961,549

NONSKID TIRE CHAIN

Samuel H. Calhoun, Tappen, British Columbia, Canada

Application September 19, 1933, Serial No. 690,126

1 Claim. (Cl. 152—14)

This invention relates to improvements in non-skid tire chains for automobiles and trucks and particularly designed for heavy duty work upon dirt roads in mountainous country and ice and winter conditions.

A particular object of my invention is to provide a heavy duty non-skid tire chain suitable of use at all seasons of the year upon unpaved roads, especially in hilly country.

A further object of my invention is to provide a tire chain adaptable of fitting with standard calks to increase the traction upon icy roads under winter conditions of driving.

A still further object of my invention is to provide a tire chain having integral chain tightening means built into the side chains whereby all slack can be taken up after the chains are fitted around the wheels.

Still another object of my invention is to provide a tire chain having substantial flat spring links for connecting the main traction links together and to the side chains whereby in case of breakage quick and easy repairs may be effected.

Still further objects are to provide an improved toggle link in the side chains for connecting the ends together, to provide angularly disposed and flexible traction elements instantly replaceable without the use of any special tools.

With these and other objects in view I have invented the tire chain that is the subject matter of this application and which is described in the following specification and further illustrated in the drawing accompanying and forming part of this application, and in which:

Figure 1 illustrates a section of tire chain having a chain tightening device built into the side chains and further illustrates the centre traction links fitted with calks.

Figure 2 is a side elevation of spring connecting link for securing the main traction links together and to the side chains.

Figure 3 is a plan view of toggle link for connecting the ends of the side chains together shown connected to a single chain link to illustrate its application.

Figure 4 is a detail view of calk fitted to main traction link.

Figure 5 is a side elevation of chain tightening device in partially open position.

In the drawing like numerals indicate like parts and the numeral one indicates a pair of side chains of an automobile non-skid tire chain, having side connecting links 2 in turn connected to the flat spring links 3.

Connected to the links 3 are a series of flat curved links 4 comprising traction elements somewhat of the nature of an S wrench in outline and having apertures 5 in the ends 6 thereof.

The ends 6 are halved in thickness so that when they are connected together they are substantially of the thickness of the main body member 4.

Intermediate the ends 6 are apertures 7 for the reception of calks therein to increase the traction effort.

The apertures 7 may be screw threaded or slightly tapered to accommodate the type of calk selected for use which preferably are of standard type.

The ends of the side chains 1 are connected together by the toggle link 8 illustrated in Figure 3 which provides a quick and convenient way of connecting the ends of the side chains.

Built into the outer side chain 1 is a chain tightening device 9 illustrated in Figure 5 for taking up the slack of the chain after the tire chains are applied to the wheels of a vehicle.

The device 9 comprises a pair of U-loops 10 and 11 connected together by a slotted link member 12 to which the loops 10 and 11 are pivoted.

In the lower edge of the U-loop 11 is formed a slot 13 which engages with the pivot 14 secured in the end of the U-loop 10 when the loop 11 is retracted and housed in the loop 10 when in the closed position as shown in Figure 1.

When the tire chains are being applied to the wheels of a vehicle the chain tightening device 9 is opened up to its full extent as partially indicated in Figure 5 and after the ends of the side chains have been secured together by the toggle link 8 the chain tightening device 9 is closed after the manner illustrated in Figure 1 by a suitable pivoted clamp member provided for that purpose which pivots or swings over the loop 11 upon the link member 12 and houses the loop 11 within the loop 10.

After the chain tightener is closed any strain upon the ends of the loops 10 and 11 causes the slot 13 to engage with the pivot 14 and prevents the loop 11 from being pulled out of the loop 10.

To disengage the chain tightener the strain upon the side chain must be first relieved to permit of the loop 11 moving within the loop 10 to disengage the slot 13 from the pivot 14 to permit of raising the loop 11 within the loop 10.

Having now described my invention what I claim and desire to be protected in by Letters Patent, is:

A non-skid tire chain comprising in combination with the side chains, a series of flat curved links angularly disposed to said side chains, said links having apertured ends of reduced thickness adapted for linkage together to comprise a joint of substantial body thickness of said links, spring connecting links securing said apertured ends together and to said side chains, means for securing calks in said curved links intermediate the ends thereof, and means for tightening the side chains of said tire chain.

SAMUEL H. CALHOUN.